US012804390B2

(12) United States Patent
McGregor et al.

(10) Patent No.: US 12,804,390 B2
(45) Date of Patent: Nov. 17, 2026

(54) SYSTEM AND METHOD FOR SECURE-CORE SILICON MOBILE END-POINTS TO DETERMINE KNOW YOUR CUSTOMER (KYC) AND KNOW YOUR TRANSACTION (KYT)

(71) Applicant: SLC Corporation, Las Vegas, NV (US)

(72) Inventors: Travis M. McGregor, Las Vegas, NV (US); Eric J. Maloney, Bedford Corners, NY (US)

(73) Assignee: SLC Digital Corporation, Albany, NY (US)

( * ) Notice: Subject to any disclaimer, the term of this patent is extended or adjusted under 35 U.S.C. 154(b) by 0 days.

(21) Appl. No.: 18/610,571

(22) Filed: Mar. 20, 2024

(65) Prior Publication Data

US 2025/0365572 A1 Nov. 27, 2025

(51) Int. Cl.
*H04W 12/04* (2021.01)
*H04W 12/06* (2021.01)

(52) U.S. Cl.
CPC .................................. *H04W 12/04* (2013.01)

(58) Field of Classification Search
CPC .............................. H04W 12/04; H04W 12/06
See application file for complete search history.

(56) References Cited

U.S. PATENT DOCUMENTS 11,751,059 B1 * 9/2023 Kant ..................... H04W 12/37 726/5
12,207,095 B2 * 1/2025 Ben-David ............. H04L 51/02
12,641,078 B2 5/2026 Ben-David
2006/0235796 A1 * 10/2006 Johnson ................. G06Q 20/12 705/26.1
2013/0165075 A1 * 6/2013 Rishy-Maharaj ..... H04W 12/04 455/411
2020/0128393 A1 * 4/2020 Wane ...................... G06F 21/64
2020/0367043 A1 * 11/2020 Anand .................. H04W 12/40
2023/0021642 A1 * 1/2023 Grayson ................ H04W 8/26
2023/0254678 A1 8/2023 Ben-David
2023/0362655 A1 * 11/2023 Farag .................. H04W 12/128
2025/0159484 A1 5/2025 Ben-David

* cited by examiner

*Primary Examiner* — Andrew Suh
(74) *Attorney, Agent, or Firm* — Schott, P.C.

(57) ABSTRACT

This invention introduces a novel hybrid system that integrates Mobile Network (MN), Internet Cloud (IC), and Node Consensus (NC) components. The system leverages secure-core silicon mobile end-points to monitor mobile network data traffic, device environmental probes, and authorized user input. By analyzing mobile radio frequency data-packet patterns and capturing users' physical environment and behavior, the system creates a unique, non-duplicable pattern. This pattern is then used to sign and authorize on-chain transactions, enabling secure execution of smart legal contracts and the storage of immutable data. The software and hardware components undergo authentication before being stored on-chain.

18 Claims, 6 Drawing Sheets

SYSTEM AND METHOD FOR SECURE-CORE SILICON MOBILE END-POINTS TO DETERMINE KNOW YOUR CUSTOMER (KYC) AND KNOW YOUR TRANSACTION (KYT)

BACKGROUND

Global economy based on the U.S. dollar being recognized as a "hard currency" due to the political and economic stability of the United States. At the time of this patent filing and priority date more than two dozen countries recognize the U.S. dollar as legal tender. Uncertainty is introduced through changes in state of the U.S.'s domestic economy, economic regulation, political gyrations, and deliberate manipulation to influence, or even sanction, nations, organizations, and at times individuals around the world. This dichotomy is not sustainable for an inclusive global economy to reach all people.

There are at least 27 countries that accept U.S. dollars as legal tender, either officially or unofficially. Most nations recognize the U.S. dollar as hard currency, which is money that is issued by a nation that is seen as politically and economically stable and widely accepted around the world as a form of payment. However, with mounting national debt and changes in U.S. policy which have promoted globalization since the end of World War II over seventy-five years ago, an increasing number of countries and international organizations have been considering alternatives to the U.S. dollar for their national and supranational economic activities.

SUMMARY OF THE INVENTION

The intent of this System and Method is to democratize economic services by providing access to basic and fair financial services for people who are unbanked or underbanked, such as those with disabilities, minorities, or marginalized groups. The method will leverage blockchain-based processes, embedded in smart legal contracts using on-chain internal bank-ledger transactions.

The System and Method will incorporate blockchain smart legal contracts to automatically adjust the supply and demand balancing trade finance and consumer lending down to a single person.

This System and Method to Tokenize Deposits at the core internal-ledger of central, commercial, development, and regional fiat currency banks aim to provide an alternative to the high volatility, outside remittance type money services, and low usability of other E-Tokens (cryptocurrency, Bitcoin, and stable-coins) as a medium of global digitalization exchange using on-chain smart legal contracts. This method is designed to create decentralized financial and asset management services that allow anyone to access and use blockchain technology and smart legal contracts to ensure the security, transparency, accountability of the internal-bank real-time services, and provide global inclusive opportunities for the people of the world by building local economies never before possible.

It would potentially also allow users to choose from a variety of lending options according to their preferences and needs, so users could have more financial inclusion and empowerment, as well as access to a global network of peers who can trade and exchange value with each other. The platform would also reduce the barriers and costs of entry for accessing and using tokenized deposits, such as regulatory compliance, intermediaries, and fees.

The two very important challenges in the digital and blockchain economy is properly identifying people and businesses, especially for Micro-SMEs and SMEs (MSME).

Digital and digitalization represented assets may have unclear, transitional and contested states of ownership. Hybrid System and Method can deploy such applications as Escrow and Repatriation method can allow digital assets to be processed through a dual or multi-party oversight process, to ensure equitable and auditable distribution of assets to one or more parties. The process can
employ Know Your Customer/Know Your Business (KYC/KYB) procedures, automated and human in the loop processes and provenance for digital and digitally represented assets to support people and MSMEs globally.

Core Industry Revolution: The International Telecommunication Union (ITU) defines the Tactile Internet as an internet network that combines ultra low latency with extremely high availability, reliability and security. It believes the Tactile Internet represents a "revolutionary level of development for society, economics and culture".

The mobile internet allowed us to exchange data and multimedia content on the move. The next step is the IoT, which is enabling the interconnection of smart devices. The Tactile Internet is the next evolution that will enable the control of the IoT in real time. It will add a new dimension to human-to-machine interaction by enabling tactile and haptic sensations, and at the same time revolutionize the interaction of machines.

The Tactile Internet will enable humans and machines to interact with their environment, in real time, while on the move and within a certain spatial communication range. It will unleash the full potential of the fourth industrial revolution, dubbed Industry 4.0 (moving beyond Web 3.0), and revolutionize the way we learn and work through the Internet of Skills, aka Human 4.0.

Proponents of the Tactile Internet argue that it should build on areas where machines are strong and humans are weak, so that the machines complement rather than substitute humans. As the power of the machines increases, the value of the human input should also grow.

This invention, using the before mentioned methods, to determine Equivalent Methods for human identification by use of a on-chain data-processing protocols managing immutable data layers for software-node-chain methods and hardware secure-core-silicon methods to achieve the promise of the Tactile Internet will have applications, including but limited to, automation, robotics and telepresence are already growing in importance in industrial applications like smart factories and the remote operation of industrial machinery enabling the efficient manufacturing of highly customized products, remote precious metals and stones mining in high-risk areas, and
remote inspection, geological reports as to provide adequate background information to inform mining operations, compliance, black-listed:sanctioned unmined assets, contract management, location of the site(s), the general site setting, the proposed land use, and the purpose and scope of the geologic investigation to provide remote management for instant liquidity with captive fiat-cash deposits in ATMs to assets in the ground for financial:risk:compliance:rate of liquidity to time ratios.

Current State of The Art ID Verification: Government Passports, Driver Licenses, and National IDs (IDs), among other identification documents serve as credible identification documents, but they have limitations when it comes to proving a person's true identity.

IDs are primarily designed for international and domestic travel, banking, asset management, taxation, succession, investing, but are not designed to meet the modern age of digitalization. Government IDs establish the holder's citizenship, and street address along with a picture of the person. All of this data is "static" in the digital economy that demands continuous authentication of many factors required to combat fraud, crime, terrorism, and inefficiencies and hacks in current ID and KYC systems.

IDs are vulnerable to AI-generated fake IDs, which have become a highly concerning issue, especially when it comes to remote identity verification, which is normal in the digital economy and world infractures.

OnlyFake in the dark web application uses neural networks to generate realistic fake ID images. It aims to fool remote identity verification tools. For instance, sites like Bitcoin, which require only a photo of a Government ID for sign-up, are at risk from customers using AI-generated fake IDs to create false identities. However, our investigation revealed that the images produced by OnlyFake were far from visually passable IDs and would likely fail to scan or fool an ID scanner.

Telegram Channel fraudsters have been discussing AI-created fake IDs on a Telegram channel. One such linked site is Passport Cloud, which offers a user-friendly interface for generating fake IDs. While AI may have been used to create visual templates, these IDs are useless in brick-and-mortar scenarios or when attempting to bypass ID authentication. They lack ultraviolet or infrared markings, making them detectable in physical situations.

Creating a Fake ID Using AI, you input your information into the system. This includes your name, personal data, photo, and birth date. The system then generates a fake ID that looks like the real thing. OnlyFake's Process users enter their name, biographical data, upload a photo (or choose one from OnlyFake's archives), and select an AI-generated signature. In minutes, OnlyFake generates images of the fake ID's front and back, which users can attempt to upload to websites requiring ID verification.

Authenticity limitations in these AI-generated fake IDs lack ultraviolet or infrared markings, rendering them ineffective in physical scenarios. They can only be used where an image of an ID can be uploaded.

In summary, while AI-generated fake IDs exist, their limitations make them unsuitable for most practical purposes. Businesses should continue to enhance their fraud detection and identity verification solutions to stay ahead of evolving threats. IDs contain essential information such as the holder's name, photo, nationality, and passport number. While this information is valuable, it doesn't provide a comprehensive picture of a person's identity.

Lack of biometrics is a major issue. Although modern IDs include biometric features (such as facial recognition and fingerprint templates and scans), these features are not always used for routine identity checks. Everyday identity verification often relies on additional biometrics (like fingerprints or retinal scans) that passports do not capture.

With the era of real-time-services, including real-time-payment and real-time-ledger-settlement, now offered in the global banking systems, remote and digital identification is critical. IDs are critical, but only the first step. Using mobile technology, standardized in every country in the world, offers a new dimension to capture and analyze mobile radio frequency transmissions and sensor readings from mobile device MEMs devices to capture and identify unique patterns to prove the true identity of any person using a mobile phone operating 4G LTE and 5G radio frequency transmission spectrum.

This invention teaches novel methods to achieve robust Know Your Customer and Know Your Transaction in the digitalization economy.

DETAILED DESCRIPTION

Figure 1:
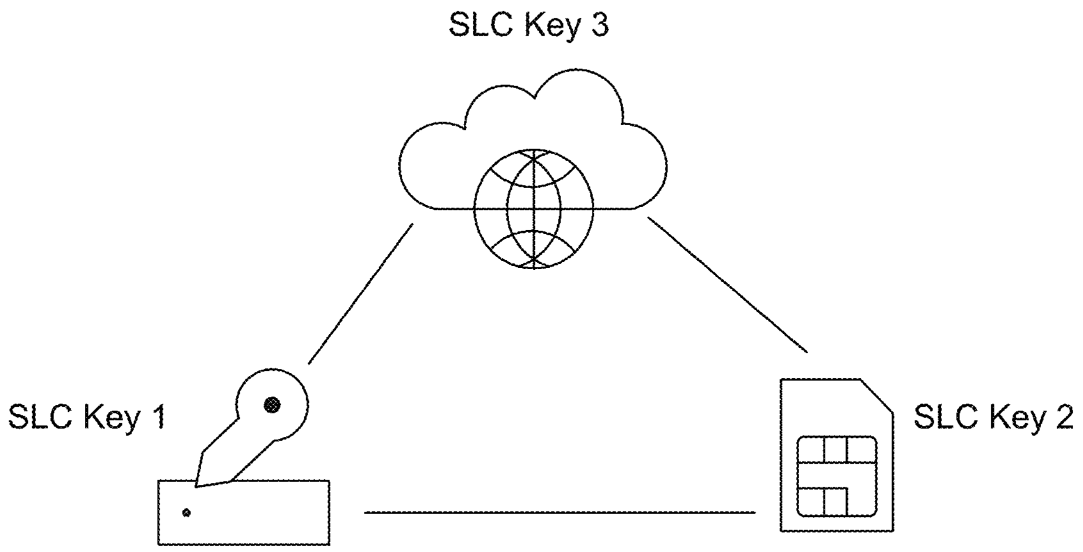
FIG. 1 illustrates a three-encryption-key multi-signature process is a cryptographic method where three separate keys are used to authorize and validate a transaction or operation.
Figure 2A:
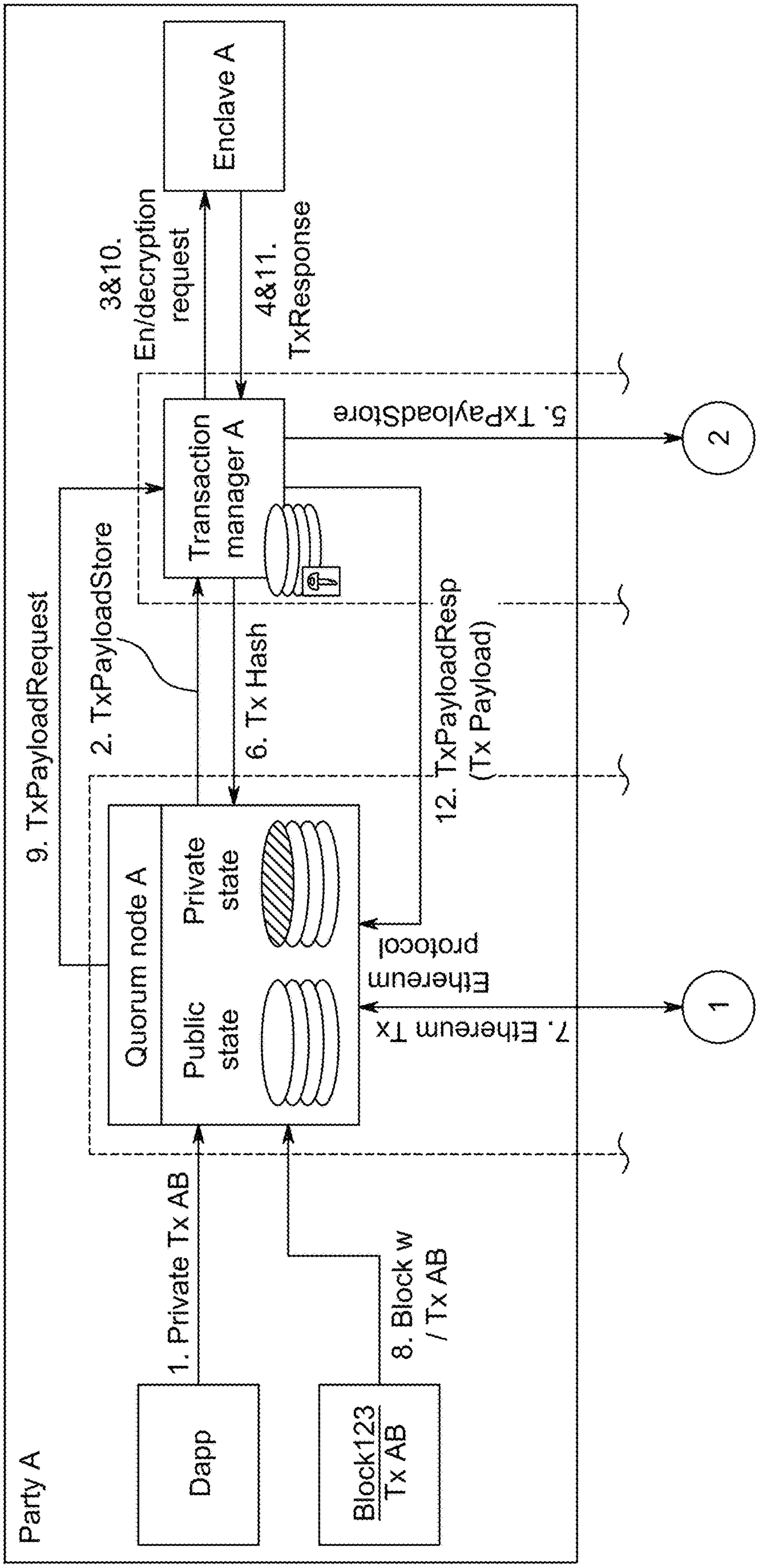
FIGS. 2A-2C illustrate variations of system architecture in which a Subscriber Identity Module (SIM)-based Applet is configured to collect data from a mobile equipment and a mobile network.
Figure 2B:
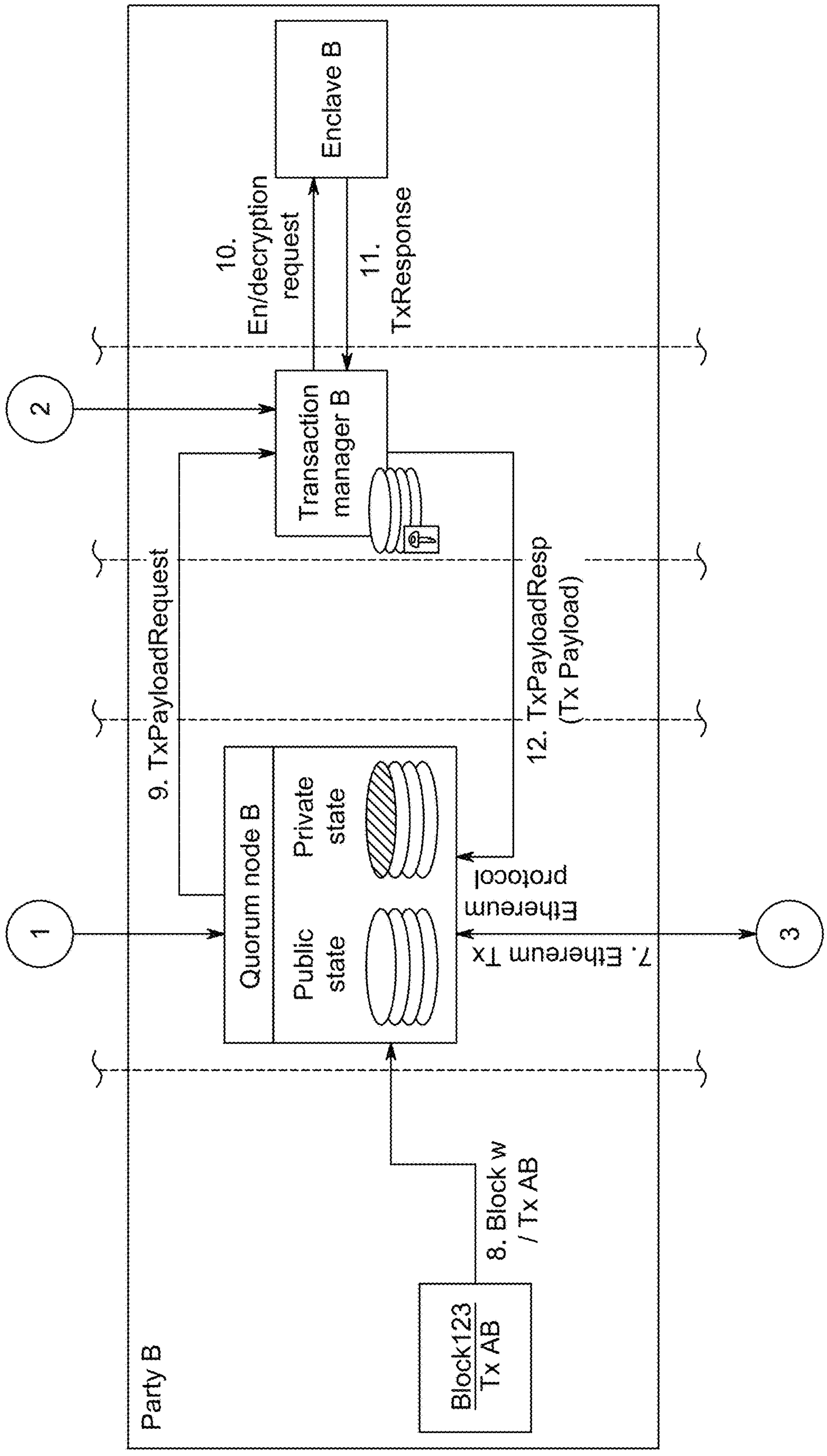
Figure 2C:
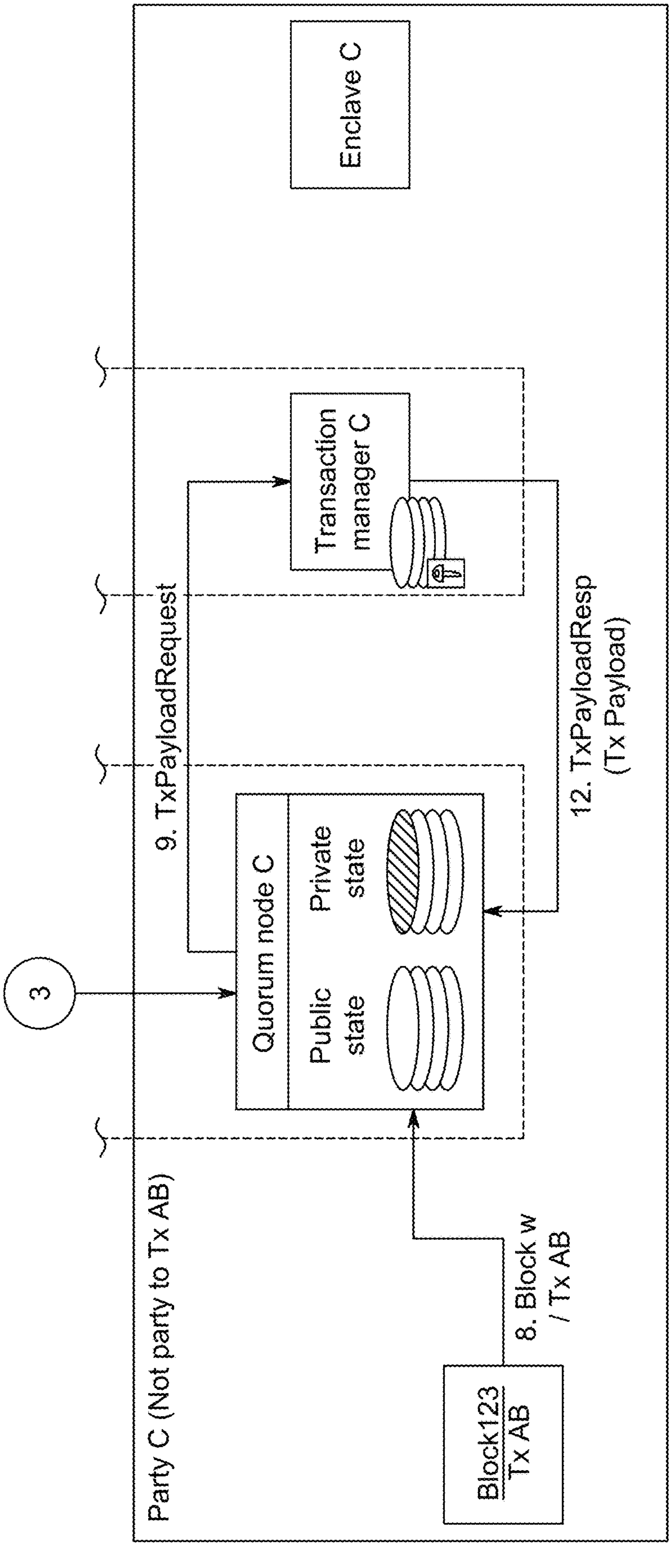
Figure 3:
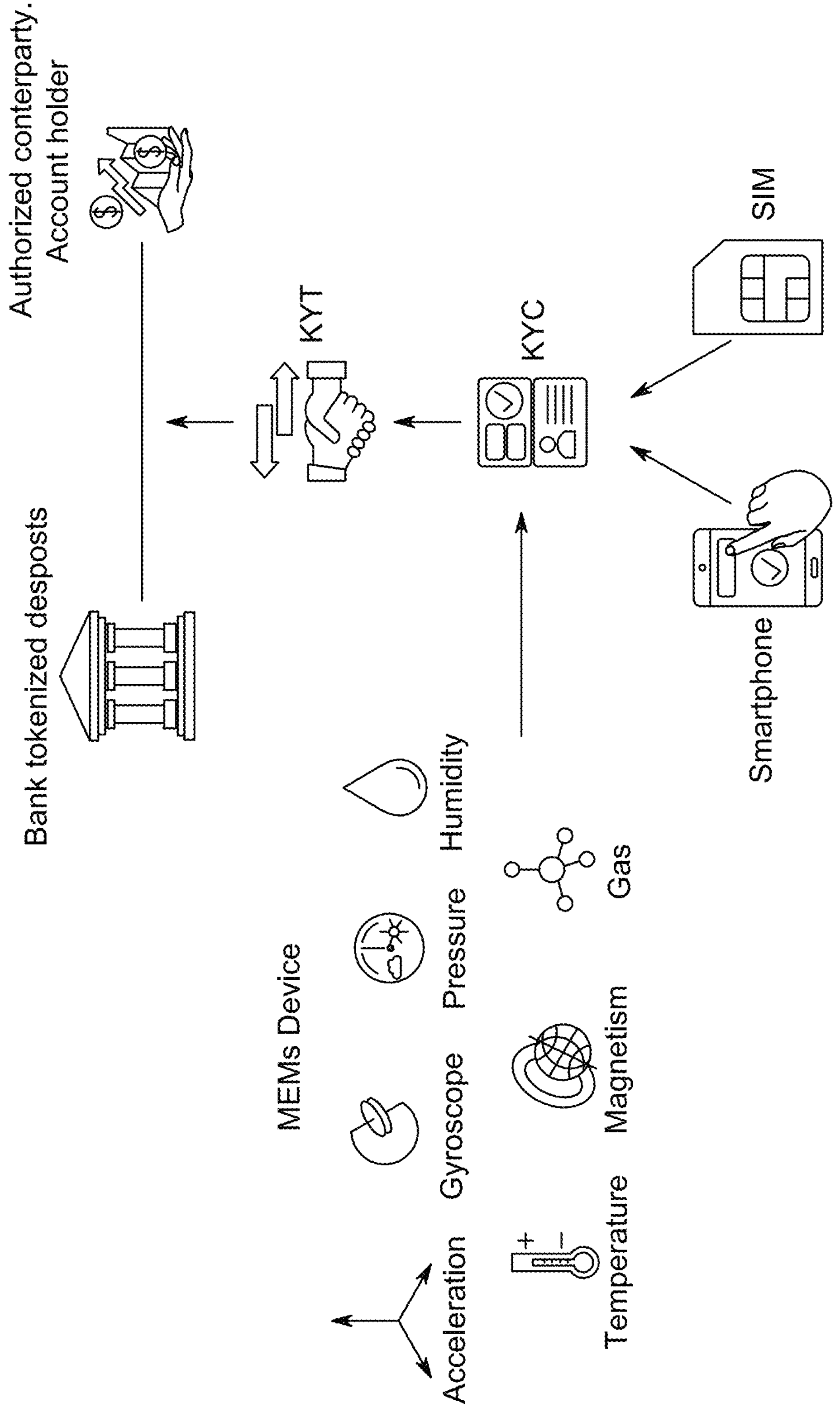
FIG. 3 illustrates the sensory environments of this invention, which includes 009 SIM, 010 Mobile Equipment (ME), MEMS device, and 011 User Input to authenticate end users and transactions in a continuous authentication method.
Figure 4:
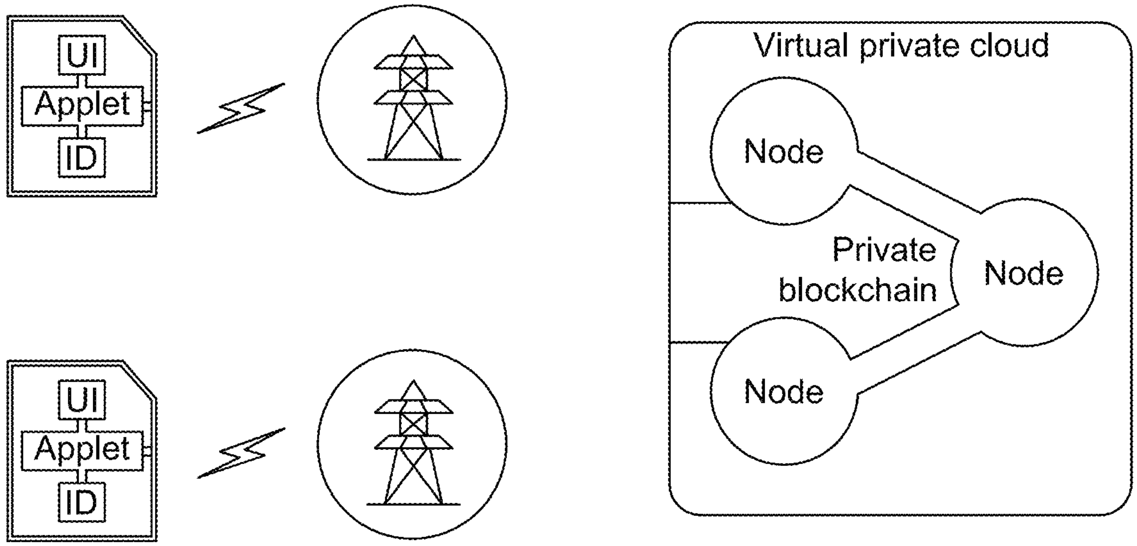
FIG. 4 illustrates the sensory, measurements, and extraction capabilities of 013 SIM are managed by a firmware embedded 014 Applet, in most implementations Java Card coding language.

A System and Method for fulfilling the economic rights asserted through the Articles of the United Nations Universal Declaration of Human Rights. The United Nations is an international organization that aims to maintain international peace and security, promote cooperation among nations, and protect human rights. This method provides a way for any organization, public or private, to provide more financially inclusive and empowering financial services, as well as access to a global network of peers who can trade and exchange value with each other. The cloud based blockchain promises that, but does not reach the population of the world to be truly effective. A hybrid mobile network, SIM, and Cloud Consensus System and Method operating together in harmony has a logical high potential of achieving this.

This hybrid approach would enhance users' rights to privacy, freedom of movement, and freedom of expression. It would support various use cases that could benefit human rights, such as supply chain transparency, voting, digital identity, and land rights management, among the properly IoT Tethered real word assets. These use cases could improve users' rights to work, education, participation, and security.

Climate Change: In the development discourse, the basic needs model focuses on the measurement of what is believed to be an eradicable level of poverty. Development programs following the basic needs approach do not invest in economically productive activities that will help a society carry its own weight in the future, rather they focus on ensuring each household meets its basic needs even if economic growth must be sacrificed today. These programs focus more on subsistence than fairness. Nevertheless, in terms of "measurement", the basic needs or absolute approach is important. The 1995 world summit on social development in Copenhagen had, as one of its principal declarations, that all nations of the world should develop measures of both absolute and relative poverty and should gear national policies to "eradicate absolute poverty by a target date specified by each country in its national context." It is not in the interest of politicians to ever reach this goal of eradicating both absolute and relative poverty. Reducing the political, unneeded, criminal, and terrorist influences this can be achieved in the global supply chain that operates transparently and all counterparties to all transactions are known and legal.

Government regulatory agencies, such as the Securities and Exchange Commission in the United States, Financial Conduct Authority (FCA) in the United Kingdom, Securities & Commodities Authority (SCA), in the United Arab Emirates, The Australian Securities and Investments Commission (ASIC), in Australia, among other securities regulation agencies in the world, provide "accredited type" or sophisticated investor is an investor with a special status under financial regulation laws. The definition of an accredited investor, and the consequences of being classified as such, vary between countries. In the United States the SEC regulates two classes of investors, either Reg. D or Reg. A., the issue is that no interoperable methods and systems exist to quickly determine in the age of digitalization, (i) inclusive, by social development goal, status, (ii) real-time capture of secured debt:unsecured debt: income over specified time period:assets:liquidity options:timing, (iii) identification methods outside of government ID verification, and (iv) complete immutable payment transaction history.

Technical Specification

In the era of cloud computing, where server execution and storage software reside in a unified ecosystem, vulnerabilities arise. Encryption key generation, distribution, signing, and root-of-truth recovery all occur within this cloud environment. However, this centralized approach lacks the redundancy and separation necessary for robust security. To address this, our system employs secure-core silicon mobile end-points, ensuring that no single entity has full control over the software execution environment.

Additionally, existing private and public blockchain technologies fail to verify data records for correctness and authorization before storing them in immutable data. Our solution bridges this gap by combining MN, IC, and NC elements, creating a secure and authenticated environment for on-chain transactions and data storage.

This invention presents a novel fusion of Mobile Network (MN), Internet Cloud (IC), and Node Consensus (NC) components.

Integration of components, (i) Mobile Network (MN), the system operates within the mobile network environment, (ii) Internet Cloud (IC), the cloud-based services play a crucial role in data processing and storage, and (iii) Node Consensus (NC) is the process of decentralized consensus mechanisms to ensure trust, agreement, and immutable data recordation among network nodes.

Secure-Core Silicon Mobile End-Points: Serve as trust anchors, ensuring the security of critical data. They monitor mobile network traffic, environmental probes, and user input. By analyzing radio frequency data transmission patterns and physical behavior and environment, a unique pattern is created.

On-Chain Transactions use three encryption keys in three different logical and physical locations that two keys are used to sign and authorize on-chain transactions in a multi-signature framework. Smart legal contracts can be self-executed creating a manifestation of mutual assent by two or more persons to one another. It represents a meeting of the minds with a common intention and is established through offer and acceptance. In the case of smart legal contracts related to this invention, the "agreement" shall be expressed through English and follow common law structure and interpretation.

Authentication and KYC/KYT:

The SIM and HSM (Secure-Core Silicon Mobile End-Points) manage Know-Your-Customer (KYC) and Know-Your-Transaction (KYT). Continuous transaction-by-transaction authentication enhances security.

Hardware Security Module (HSM):

An HSM is a specialized cryptographic processor designed to safeguard the entire lifecycle of cryptographic keys. These trust anchors play a critical role in protecting the cryptographic infrastructure of security-conscious organizations worldwide. Here are the key aspects of HSMs. Purpose: HSMs are dedicated devices that securely manage, process, and store cryptographic keys. They serve as the guardians of sensitive keys, ensuring their confidentiality, integrity, and availability. Use cases involve transaction security. Enterprises use HSMs to secure financial transactions, payment processing, and digital currency operations. Identity Protection with HSMs play a vital role in managing digital certificates, ensuring secure authentication, and protecting user identities. HSMs excel at provisioning encryption, decryption, digital signing, and authentication services for various applications.

HSMs play a major part of smart legal contract of systems that execute smart legal contracts securely, mainly in the area of off-network key restoration for backup purposes and onsite off-network transaction authentication. HSMs are tamper resistant where physically hardened against tampering, making them resistant to attacks.

HSMs securely store cryptographic keys, preventing unauthorized access. Cryptographic operations: play a critical role for HSMs to perform encryption, decryption, and other cryptographic functions.

Root of Trust: HSMs establish a trusted foundation for cryptographic operations.

Key Lifecycle Management: HSMs handle key generation, distribution, and retirement.

HSM Java Card Applets:

An HSM Java Card Applet is a software program that runs on a Java Card (a secure microcontroller). It provides HSM functionality within the Java Card environment. Common applications include digital signatures, encryption, authentication, and certificate management.

Two Notable HSM Java Card Applets:

SmartCard-HSM: An open-source applet supporting RSA and ECC keys, PKCS #11, CSP-Minidriver, and OpenSC. Available as a USB key, smart card, plug-in, or MicroSD card.

RIscRIpt/HSMApplet: A custom applet implementing a subset of the PKCS #11 interface, supporting RSA keys and SHA-256 hashing. Designed for low-resource Java Cards. HSMs are critical components in securing sensitive data and ensuring the trustworthiness of cryptographic operations.

System Identification Module (SIM):

A SIM is an integrated circuit (IC) based on secure-core-silicon. Its primary purpose is to provide tamper-resistant, immutable storage of data within hardware. Here are the key aspects of SIMs:

Functions include Identity and Authentication. SIMs securely store an International Mobile Subscriber Identity (IMSI) number and its related key. Mobile Subscriber Identification: SIMs enable mobile devices (such as phones and laptops) to identify and authenticate subscribers on mobile networks.

Physical Form: The actual physical card housing the SIM is known as a Universal Integrated Circuit Card (UICC). UICCs are typically made of PVC with embedded contacts and semiconductors.

The SIM itself is the primary component within the UICC.

TERMINOLOGY AND TERMS

Although technically accurate to refer to the IC as the SIM, in practice, the term "SIM card" is still commonly used to describe the entire UICC unit.

SIM Application Toolkit (SAT) Applet:

Embedded within both pSIM (physical SIM) and SIM platforms.

Enables direct and secure communication via Over-the-Air (OTA) channels.

Managed by Mobile Network Operators (MNOs) globally.

Secure Execution Environments: pSIM and qSIM are standardized secure execution environments for Java Card Applets. These environments ensure the integrity and confidentiality of SIM-based operations.

Leveraging Industry Standards: This invention builds upon industry-standard SIM Application Toolkit APIs and utilizes the Oracle Java Card programming language.

SIMs play a crucial role in mobile communication, ensuring secure identification, authentication, and transaction capabilities across various devices.

Cloud Environment Overview:

Web Frontend: Language: TypeScript. Framework: React.js. State Management: Redux (for managing application state)

Server Backend: Language: TypeScript (Node.js): Framework: Nest.js (for building the API).

Database: Type: MySQL (relational database): Mobile Application: Platform: Cross-platform (iOS and Android): Development Framework: React Native (enables cross-platform mobile app development with a shared codebase). Cloud Server (AWS Focus): Platform: Amazon Web Services (AWS). AWS is chosen for its extensive services and global infrastructure.

Compute: Service: AWS EC2 (Elastic Compute Cloud). Provides scalable compute capacity (virtual servers). Storage: Service: AWS S3 (Simple Storage Service): Used for object storage and data backup.

Database: Service: AWS RDS (Relational Database Service): Provides managed relational database services (MySQL in this case): CI/CD. Tools: Terraform (for infrastructure as code) with GitHub Actions (for continuous integration and continuous deployment). Serverless Functions: Service: AWS Lambda Executes code in response to events (e.g., API requests, file uploads): Key Management Service (KMS):

Service: AWS KMS: Manages cryptographic keys, specifically for secure wallet key storage. Essential for protecting sensitive blockchain transaction information. API Management: Service: AWS API Gateway: Creates, publishes, and secures APIs. Acts as a front door for your backend services.

Monitoring: Service: AWS CloudWatch: Monitors resources, logs, and metrics. Provides insights into system performance and health: Cloud environment is a powerful combination of services and tools, allowing you to build scalable, secure, and reliable applications. Blockchain Software Components: Blockchain Network: Platform: Ethereum. Purpose: Supports smart legal contract capabilities and has a robust community. Smart Legal Contract Development Language: Solidity Development Tools: Hardhat (for building and testing smart legal contracts). Consensus Mechanism for Private Networks (PoA). Platform: Quorum: Consensus Algorithm: Proof of Authority (PoA)

Requires two out of three keys to authorize on-chain Quorum transactions. Interacting with Smart Legal Contracts: Libraries: Web3.js or ethers.js (in the React environment). These libraries facilitate communication with smart contracts on the Ethereum network: Hashing in Blockchain Hashing is a cryptographic technique that maps arbitrary-size data (such as text or files) to fixed-size values. The output of a hash function is called a hash value or hash code. Hashing ensures data integrity and security. Properties of Cryptographic Hash Functions: Data Integrity: Hashes ensure that data (e.g., transactions) remains unchanged. Block Linking: Each block contains a hash of the previous block, creating a secure chain (the blockchain): Merkle Trees: Hashes are used to efficiently verify transactions within a block: Public Key Cryptography: Hashing connects public keys to private keys, preventing the derivation of private keys from public keys: Hashing is a fundamental building block of blockchain technology. It provides security, integrity, and trust within the decentralized network.

Encryption Key Framework: To deploy smart legal contracts, three encryption keys (SC Key) in separate logical and physical locations provides governance, management, regulatory compliance, and execution for on-chain encryption key management in Cloud, HSM, and SIM software operating environments. This is a multi-signature digital framework, which takes two keys to sign and hash each on-chain transaction.

Three Dimensional Identification (3DI):

3DI is defined as capturing critical identification and authentication data from three separate software processing environments (i) SIM/Mobile Network, (ii) MEMs Device, and (iii) User Input.

SIM/Mobile Network: Metric Capture I (MCI):

Based on McGregor, et al. U.S. Pat. No. 7,596,373 incorporated herein by reference, the following data elements are captured based on mobile network, SIM, and smartphone interactions. This invention receives at least one data element from the Metric Capture I table below:

3DI involves capturing critical identification and authentication data from three separate software processing environments. These environments include:

SIM/Mobile Network:

Metric Capture I (MCI): Based on interactions within the mobile network, SIM card, and smartphone.

Captures essential data elements related to identification and authentication.

While the specific data elements from Metric Capture I are not provided here, the goal is to integrate information from these three distinct sources to enhance identification and security.

Method Description: Objective: Capturing data elements associated with Know Your Customer (KYC) and Know Your Transaction (KYT) in 3DI environments for blockchain transactions.

Components Involved: Mobile Communications Device: Within a mobile communications network.

SIM (Subscriber Identity Module): Captures data elements generated by each of MCI, MCII, and MCIII.

Process: The SIM captures relevant data elements (MCI, MCII, and MCIII). The SIM stores these data elements. The SIM establishes a 3DI communication channel (3DI COMMS) to transmit the collected data elements to the MC (Master Control) verification server. Once verified, two encryption keys are used to authorize and hash the transaction.

This method aims to enhance security and trust in blockchain transactions by leveraging 3DI environments and SIM-based data capture.

SIM/Mobile Network: Metric Capture I (MCI):

Based on McGregor et al. U.S. Pat. No. 7,596,373, the following data elements are captured based on mobile network, SIM, and smartphone interactions.

This invention receives at least one data element from the Metric Capture I table below:

TABLE 1

| | | |
|---|---|---|
| Network Transitions (Moving From 2 G, 2.5 G, or 3 G) | Terminal Memory Usage (e.g. dynamic) | Dropped Connections, Connection Time (i.e. success and failure) |
| Energy per Chip Noise Ratio (ECNR) | Received Signal Strength Indicator (RSSI) | Signal to Interference Ratio (SIR) |
| Battery Strength | Packet Retransmission | Frame Error Rate for Voice (FER) |
| Block Error Rate for Data (BLER) | Bit Error Rate (BER) | Packet Loss |
| One Way Delay | Round Trip Delay | Inter-packet Delay |
| Bandwidth | Configuration (e.g. model of terminal, OS version, OS type, and loaded applications, etc.) | (Jitter) Identification (e.g. SIM-IMEI, MSISDN, and ICCID) |
| WiFi and RTLS Triangulation Geolocation | Base Station Triangulation Geolocation | Digital Rights Management |
| Location and Timestamp | Network (e.g., network transitions or roaming) | Data Communication (e.g., monitoring IP stack layers such as the physical layer) |
| Mobile Handset's Hardware Radio | | |

MEMS Device: Metric Capture II (MCII):

The Micro-Electro-Mechanical Systems (MEMS) provides sensor capabilities to measures and receives at least one data element from the Metric Capture II table 2 below:

TABLE 2

| | |
|---|---|
| Accelerator: | Accelerator measures acceleration forces acting on the mobile device. At its core, an accelerometer consists of a proof mass, a small, movable mass suspended within the mobile device. When the smartphone experiences acceleration (such as tilting or shaking), the proof mass moves from its normal position. One example of measurement, capacitive sensors detect movement by measuring the change in electrical capacitance caused by the proof mass's displacement. |
| Gyroscope | The gyroscope measures the rotation rate of the smartphone around its axes (roll, pitch, and yaw). The gyroscope relies on capacitance sensors. Example sample rotations up to 6,000 times per second, generating a new measured value every 0.16 millisecond. |
| Gas | Electrochemical reaction of gas molecules on the electrode surface when gas molecules interact with the sensor surface, they induce changes in potential difference or current between the electrodes. These changes are proportional to the concentration of the gas, allowing the sensor to detect its presence and measure its concentration. Gas sensors include Metal Oxide Sensors (MOS), these sensors detect gas concentration by measuring the resistance change of metal oxide due to gas adsorption. For example, they can detect gasses like CO2, NOx, SO2, and formaldehyde.<br>Piezoelectric Sensors, these sensors utilize the piezoelectric effect to detect gas molecules. Various types include Piezoelectric Microcantilevers. These tiny structures bend when gas molecules interact with their surface. Surface Acoustic Waves (SAW), gas-induced changes in acoustic waves are detected, Quartz Crystal Microbalance (QCM), gas adsorption alters the crystal's resonance frequency, and Piezoelectric Micromachined Ultrasonic Transducer (PMUT): Detects gas-induced changes. |
| Pressure | Sensors detect pressure by monitoring the deformation of a diaphragm. The diaphragm is a thin, flexible structure made from materials like silicon or polymers when subjected to pressure, the diaphragm bends or flexes, causing a change in its electrical properties. Example sensors include, Piezoresistive a conductive sensing element directly fabricated onto the diaphragm. Changes in resistance of these conductors provide a measure of the applied pressure. These sensors are widely used in applications like automotive, medical devices, and household appliances and Capacitive conducting layers are deposited on the diaphragm and the bottom of a cavity to create a capacitor. Deformation of the diaphragm changes the spacing between the conductors, altering the capacitance. |
| Temperature | Thermocouples, these are contact-based sensors that generate a voltage proportional to the temperature difference between two dissimilar metals, Thermistors, these semiconductor-based sensors exhibit a change in resistance with temperature. They are sensitive and widely used in applications like climate control and medical devices, and sensors use the expansion or contraction of temperature-sensitive materials (such as diaphragms or beams) to detect temperature changes. The metallic layer on these structures changes its electrical resistance due to the diaphragm's shape alterations. |

TABLE 2-continued

| | |
|---|---|
| Light | Optical MEMS integrates mechanical elements, electronics, and sensors on a silicon substrate through microfabrication. It enables unprecedented miniaturization and integration in optical systems. These devices combine electrical, mechanical, and optical systems to detect and manipulate optical signals at the micron level. Fabricating optical MEMS involves techniques like bulk and surface micromachining and deep X-ray lithography. |
| Magnetic Actuators | A MEMS magnetic actuator is a device that utilizes microelectromechanical systems (MEMS) to convert an electric current into a mechanical output. It achieves this by employing the well-known Lorentz Force Equation or the principles of magnetism. The Lorentz Force Equation describes the interaction between a current-carrying conductor and a static magnetic field. When a current flows through the conductor, the magnetic field around it generates a force. This force can be harnessed to cause the displacement of a mechanical structure within the MEMS device. These magnetic actuators find applications in various MEMS systems, including sensors, switches, and micro-actuators. Magnetic Sensors (Magnetometers): Magnetic sensors in MEMS devices determine the strength and direction of a magnetic field using the Lorentz force. When a looped electrical current passes through a magnetic field, the resulting force causes the loop to flex proportionally to the field's strength. These movements can be detected either electronically or optically. |
| Humidity Sensors | Capacitive Humidity is sensed using capacitance in MEMS humidity sensors. The basic structure of a capacitive humidity sensor consists of the following components: Electrode: Initially deposited on a substrate (usually silicon). Humidity-Sensitive Dielectric Layer: A thin layer (usually made of a moisture-sensitive polymer) deposited on top of the electrode. Moisture-Permeable Electrode: Added on top of the dielectric layer. Protective Layer: Covers the sensor to shield it from contamination and condensation. When the humidity-sensitive dielectric absorbs water vapor, its dielectric constant increases, leading to an increase in capacitance. Conversely, at lower humidity levels, the dielectric gives up some water, causing the capacitance to decrease. The change in capacitance is nearly linear with relative humidity (RH) and is only slightly affected by temperature. MEMS IC sensors include circuitry to convert the capacitance measurement into a digital or analog output. These sensors are manufactured using integrated circuit (IC) methods. Long-term stability is generally good in normal applications, and the small capacitance ensures accurate measurements. MEMS humidity sensors find applications in weather monitoring, air conditioning, food storage, warehousing, and industrial processes. |

User Input: Metric Capture II (MCIII):

All user input, except for mobile sensors and cameras, is direct from the SIM to the Mobile Device, bypassing iOS, Android, Firefox OS, and other Mobile Device operating system providers.

User Input involves various data captures based on the authorized user input. At least one User Input is captured as referenced in the Metric Capture III table 3 below:

TABLE 3

| | |
|---|---|
| Password/PIN (static) | User and system generated |
| One Time password | TOTP and HOTP |
| Secure Send Point: Human to Machine Challenge Response | An authentication protocol where the verifier sends the claimant a challenge (usually a random value or a nonce) that the claimant combines with a secret (often by hashing the challenge and a shared secret together, or by applying a private key operation to the challenge) to generate a response that is sent to the verifier. The verifier can independently verify the response generated by the Claimant (such as by re-computing the hash of the challenge and the shared secret and comparing to the response, or performing a public key operation on the response) and establish that the Claimant possesses and controls the secret. |
| Fingerprint Recognition | Sensors include capacitance, optical, and ultrasound. |
| Facial Recognition | Optical mobile device camera. |
| Retna Recognition | Optical mobile device camera. |
| Box Recognition | Capture of box image for Know Your Box in an on-chain recordation as an ERC 721. |

TABLE 3-continued

| | |
|---|---|
| Gait Recognition | Hand movements, waving patterns, and other activity patterns can help distinguish smartphone owners from other users, providing passive and continuous authentication. |

3DI Communication Means (3DI COMMS):

3DI communications originates its host communication via SIM Applet software. Once s least one of MCI, MCII, and MCIII is captures, the SIM Applet established an external connection via:

IMS Messaging:

IMS stands for IP Multimedia Subsystem. It's a standardized architectural framework designed to deliver IP multimedia services. IMS was developed by the wireless standards body 3rd Generation Partnership Project (3GPP) as part of the vision for evolving mobile networks beyond GSM (2G). Its original formulation (3GPP Rel-5) aimed to deliver Internet services over GPRS (2.5G). Later updates extended support to networks beyond GPRS, including Wireless LAN, CDMA2000, and fixed lines. IMS uses IETF protocols like the Session Initiation Protocol (SIP). Examples of global standards based on IMS include: MMTel: Basis for Voice over LTE (VOLTE), Wi-Fi Calling (VoWIFI), Video over LTE (ViLTE), SMS/MMS over WiFi and LTE, Rich Communication Services (RCS), also known as joyn or Advanced Messaging.

DTMF:

A DTMF (Dual Tone Multi-frequency) message is a telecommunication signaling system that uses the voice-frequency band over telephone lines. It allows communication between telephone equipment, other communication devices, and switching centers. DTMF uses a set of eight audio frequencies transmitted in pairs to represent 16 signals. These signals correspond to the ten digits (0-9), the letters A to D, and the symbols # and *. When you press a key on a telephone keypad, it generates two tones of specific frequencies. These tones are used for various purposes, including accessing voicemail (entering passwords) and navigating Interactive Voice Response (IVR) systems used by large companies like banks.

USSD:

USSD (Unstructured Supplementary Service Data), is a communication protocol used in mobile devices and networks. USSD is part of the Global System for Mobile Communications (GSM) digital cellular standard. Similar to SMS and MMS, USSD enables communication without requiring a dedicated app. Unlike SMS, which involves back-and-forth text messaging between two phones, USSD establishes a real-time connection between your phone and a mobile network or server.

SMS:

SMS, or Short Message Service, is a fundamental protocol used by cellular phones to send and receive text messages over 2G, 3G, 4G, or 5G networks. Unlike app-based messaging services that rely on internet connections, SMS operates directly within the cellular network. SMS enables the exchange of short text messages (up to 160 characters) between mobile devices. Initially designed for GSM networks, SMS continued to function across various technologies, including CDMA, HSPA, 4G LTE, and 5G. The SMS standard defines the information sent in a text message, including the message length, timestamp, destination phone number, and the actual message content.

Internet Protocol:

The Internet Protocol (IP) is a fundamental set of rules governing the exchange of data packets across interconnected networks. IP ensures that data packets can travel across networks and reach their intended destinations. Data traversing the Internet is divided into smaller pieces called packets. Each packet carries an IP address, which helps routers direct them to the correct location.

An IP address is a unique identifier assigned to devices or domains connecting to the Internet. For example, an IP address might look like 192.168.1.1. DNS resolvers translate human-readable domain names into IP addresses.

Verification Server:

The Verification Server (VS) is a System and Method for determining atmospheric conditions around the world to validate and cross reference the MEMS devices that detect such atmospheric conditions in close vicinity to determine KYC. Weather patterns cause radio frequency (RF) interference, and saturation: pressure propagation and cause interference and signal saturation in communication systems that can be cross referenced with RF packet-data and sub-packet chip energy composite. Systems and methods for determining RF KYC against mobile network and Sim Rf Measurements:

Rain Attenuation: Raindrops can absorb and scatter RF signals, leading to attenuation or weakening of the signal as it travels through the atmosphere. This attenuation is more pronounced at higher frequencies and can reduce the range and reliability of wireless communication systems, particularly for satellite communications and terrestrial microwave links.

Fog and Mist: Atmospheric moisture in the form of fog or mist can also scatter RF signals, causing signal loss and degradation. In dense fog conditions, the scattering effect can be significant, particularly at higher frequencies.

Snow: Similar to rain, falling snow can attenuate RF signals and cause signal degradation, especially in heavy snowfall conditions. Snow accumulation on antennas and transmission lines can also affect the performance of communication systems.

Tropospheric Ducting: Certain weather conditions, such as temperature inversions in the lower atmosphere, can create a phenomenon known as tropospheric ducting. This can cause RF signals to be trapped and propagate over long distances, leading to interference and distortion in communication systems.

Thunderstorms and Lightning**: Thunderstorms can generate electromagnetic interference (EMI) and induce electrical disturbances in RF circuits and transmission lines. Lightning strikes can directly damage antennas and other RF equipment, leading to signal disruption and equipment failure.

Solar Activity: Solar flares and geomagnetic storms can influence ionospheric conditions and affect the propagation of HF (high frequency) radio waves. These solar-induced disturbances can cause signal fading, polarization changes, and increased noise levels in radio communication.

To mitigate the effects of weather-related interference and saturation in RF communication systems, engineers employ various techniques such as antenna diversity, frequency hopping, power control, and adaptive modulation schemes. Additionally, accurate weather forecasting and monitoring can help operators anticipate and prepare for adverse weather conditions that may impact RF communication links. The comparison of the MEMS capture weather related with the global weather sensing systems to determine KYC.

These global weather systems provide methods to provide an array of instruments to sense and determine atmospheric conditions via computers around the world to detect weather in specific locations through a network of various technologies collectively known as weather forecasting and monitoring systems.

Satellites: Weather satellites orbiting the Earth capture images and data about cloud cover, temperature, precipitation, and other atmospheric conditions. These satellites provide a global view of weather patterns and can track storms, hurricanes, and other weather phenomena over large areas.

Radar: Doppler radar systems are used to detect precipitation, such as rain, snow, and hail, as well as the movement and intensity of storms. Radar data can provide detailed information about the location, intensity, and direction of precipitation in real-time.

Weather Stations: Ground-based weather stations are distributed across the globe to collect data on temperature, humidity, air pressure, wind speed, and wind direction. Automated weather stations continuously monitor these parameters and transmit the data to central databases for analysis.

Weather Balloons: Radiosondes are instruments attached to weather balloons that are released into the atmosphere to collect data on temperature, humidity, and pressure at various altitudes. This data is transmitted back to ground stations for analysis and used to improve weather forecasting models.

Weather Models: Computers use mathematical models of the atmosphere based on principles of physics to simulate and predict future weather conditions. These models incorporate data from satellites, radar, weather stations, and other sources to generate forecasts for specific locations.

Remote Sensing: Other remote sensing technologies, such as LiDAR (Light Detection and Ranging) and GPS (Global Positioning System), are also used to gather data on atmospheric conditions, terrain, and vegetation, which can influence weather patterns.

Crowdsourced Data: In addition to official weather monitoring systems, data from personal weather stations, weather apps, social media, and other sources are often aggregated and analyzed to improve the accuracy of weather forecasts, especially in areas with limited monitoring infrastructure.

The invention claimed is:

1. A secure communication system for mobile devices in a packet-based wireless mobile network with identity security of both user and transaction comprising:

a system controller of the secure communication system, wherein the system controller issues and controls encryption keys to users customers for secure transactions, comprising one or more hardware processors and a memory storing processor-executable instructions that implement system controller functions;

a first Subscriber Identity Module (SIM) device in the packet-based wireless mobile network, wherein the first SIM device comprises a secure-element hardware processor executing a SIM Application Toolkit (SAT) applet that captures mobile network signal metrics (MCI), hardware sensor measurements (MCII), and user input data (MCIII);

a second SIM device in the packet-based wireless mobile network that is separated from the first SIM device, wherein the second SIM device communicates with the first SIM device via a secure communications channel established using the captured mobile network signal metrics (MCI), hardware sensor measurements (MCII), and user input data (MCIII); and a packet-based communication network with data packets wirelessly transmitted in standard packets on-chain node consensus processing, wherein the mobile network signal metrics (MCI), hardware sensor measurements (MCII), and user input data (MCIII) captured by the first SIM device establish a hybrid pattern for user identity and transaction authorization under authority of the system controller before issuing encryption keys.

2. The system of claim 1, wherein the second SIM device is stationary.

3. The system of claim 1, wherein the mobile network signal metrics (MCI) are captured and analyzed as a data element for establishing the hybrid pattern for user identity and transaction authorization, the MCI comprising at least one of: signal-to-interference ratio (SIR), bit error rate (BER), round-trip delay, packet loss, or received signal strength indicator (RSSI).

4. The system of claim 3, wherein the captured mobile network signal metric comprises a unique radio-frequency signature of a user's mobile session.

5. The system of claim 1, wherein the hardware sensor measurements (MCII) are captured by one or more micro-electro-mechanical system (MEMS) sensors in communication with the first SIM device, the MEMS sensors capturing at least one of: acceleration, gyroscopic rotation rate, barometric pressure, ambient temperature, magnetic field strength, humidity, or gas concentration.

6. The system of claim 1, wherein the user input data (MCIII) is captured by one or more user security input controls of the first SIM device, the user security input controls comprising at least one of: a personal identification number, a time-based one-time password (TOTP), a biometric sensor, or a gait recognition system.

7. The system of claim 1, wherein the system controller comprises at least one dedicated cryptographic processor that analyzes the mobile network signal metrics (MCI), hardware sensor measurements (MCII), and user input data (MCIII) to establish user identity and authorize transactions, and manages a lifecycle of the encryption keys.

8. The system of claim 1, wherein three encryption keys are maintained in three physically and logically separate locations: a first encryption key within the first SIM device, a second encryption key within the second SIM device, and a third encryption key in a cloud-based key management service; and wherein at least two of the three encryption keys are required to authorize the transaction.

9. The system of claim 8, wherein a distributed ledger comprises a private blockchain operating under a proof-of-authority consensus mechanism, and wherein each transaction requires authorization by at least two of the three encryption keys, with a transaction payload stored in a private state accessible only to parties of the transaction.

10. The system of claim 1, wherein the system controller includes a hardware security module (HSM) providing off-network secure key backup and restoration.

11. The system of claim 1, wherein once the hybrid pattern is established, the system controller issues the encryption keys and the authorized transaction is completed on a distributed ledger in near real-time.

12. The system of claim 1, wherein satisfaction of the hybrid pattern triggers execution of a self-executing smart legal contract on a distributed ledger, the smart legal contract requiring a valid hybrid pattern as a precondition to execution.

13. The system of claim 1, wherein the SIM Application Toolkit (SAT) applet, upon capturing at least one data element from each of the mobile network signal metrics (MCI), the hardware sensor measurements (MCII), and the user input data (MCIII), establishes a communication channel to a verification server.

14. The system of claim 1, wherein the first SIM device triggers transmission of data packets to measure round-trip signal-to-interference ratio (SIR) as a unique per-transaction mobile network signal metric for signing each transaction.

15. The system of claim 1, wherein no single data stream alone is sufficient to establish the hybrid pattern.

16. The system of claim 1, wherein the system controller analyzes data elements generated by the first SIM device and data elements generated by the second SIM device to establish the hybrid pattern for user identity and transaction authorization.

17. The system of claim 16, wherein the hybrid pattern is unique to a particular combined use of the first SIM device and the second SIM device in the packet-based wireless mobile network.

18. The system of claim 1, wherein the second SIM device comprises a SIM Application Toolkit (SAT) applet configured to receive user input data including at least one challenge-response authentication from an authorized user of the second SIM device.

* * * * *